(No Model.)
W. H. GOSS.
PACKING CASE FOR HOLDING BANANAS DURING TRANSPORTATION.
No. 276,027. Patented Apr. 17, 1883.
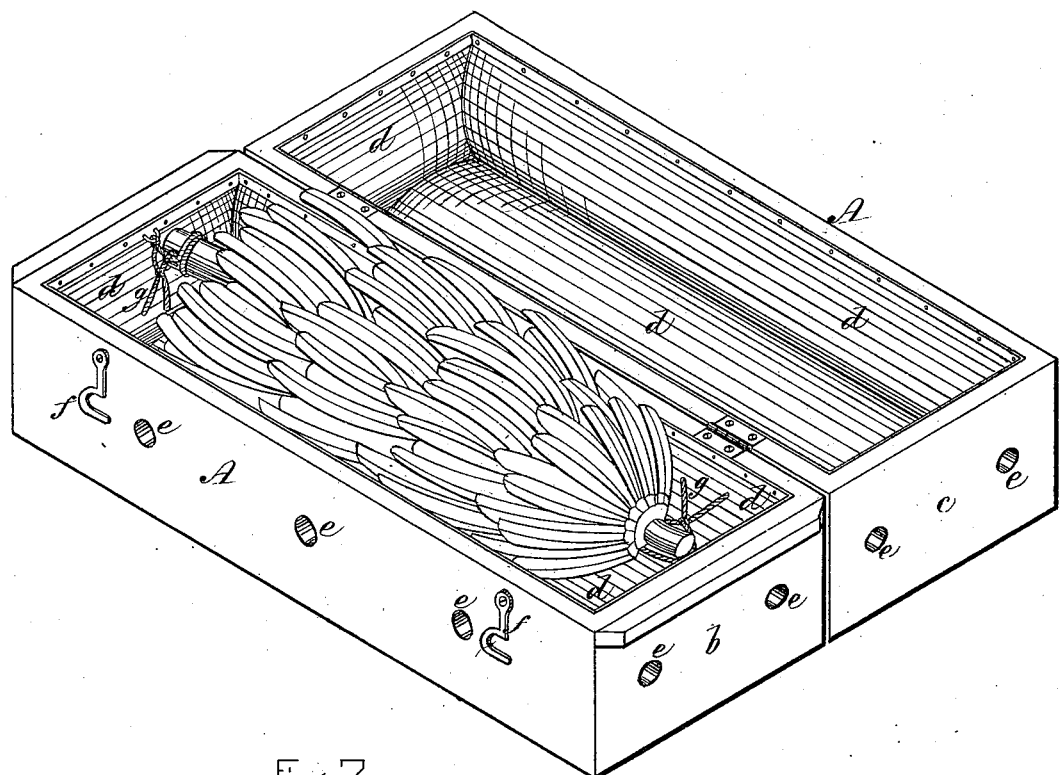
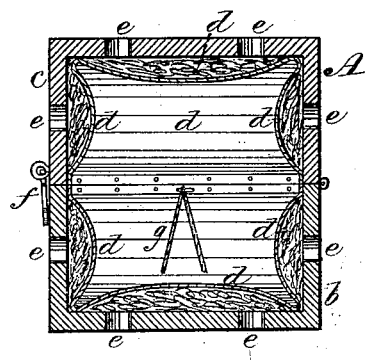
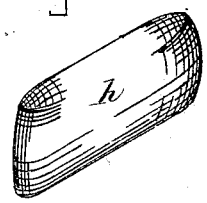
WITNESSES
W. J. Cambridge
E. S. Hanson
INVENTOR
William H. Goss
per P. E. Teschemacher
Atty.

UNITED STATES PATENT OFFICE.

WILLIAM H. GOSS, OF BOSTON, MASSACHUSETTS.

PACKING-CASE FOR HOLDING BANANAS DURING TRANSPORTATION.

SPECIFICATION forming part of Letters Patent No. 276,027, dated April 17, 1883.

Application filed March 7, 1883. (No model.)

*To all whom it may concern:*

Be it known that I, WILLIAM H. GOSS, a citizen of the United States, residing at Boston, in the county of Suffolk and State of Massachusetts, have invented a Packing-Case for Holding Bananas during Transportation, of which the following is a full, clear, and exact description, reference being had to the accompanying drawings, making part of this specification, in which—

Figure 1 is a perspective view of my packing-case open, with a bunch of bananas placed therein. Fig. 2 is a transverse vertical section through the same closed. Fig. 3 is a view of one of the small stuffed bags sometimes employed in packing the fruit in my improved case.

Bananas are usually packed by wholesale dealers for shipping or transportation to their retail customers in crates adapted to contain one or more bunches, hay being generally used as a packing material to hold the bunch or bunches in place and prevent them from being jolted against the sides of the crate, and thereby becoming bruised. This method of packing is, however, objectionable, as the hay and chaff introduces itself between the bananas while being transported, rendering them dirty and preventing their arrival at their destination in as clean, attractive, and salable a condition as is desirable. Furthermore, the wholesale dealer loses the cost of the crate, which he is expected to furnish, and which is discarded after being unpacked.

My invention has for its object to overcome these difficulties; and it consists in a packing-case especially adapted by its size and shape to receive one or more bunches of bananas, and having its interior padded or stuffed to prevent the movement of the bunch within the case, and thus avoid the jolting and bruising of the fruit in transportation, and at the same time insure its delivery in a perfectly clean and attractive condition, suitable apertures, preferably formed in all sides of the case, being provided for the introduction of air for the perfect ventilation of its interior, whereby the fruit is properly preserved, as desired.

In the said drawings, A represents a wooden box or packing-case composed of two halves or portions, *b c*, hinged together, and of a suitable size and shape to contain a bunch of bananas, which fits half into the lower portion and half into the upper portion of the case, thus facilitating the removal of the bunch without injury. The interior of both the upper and lower portions of this case is padded or stuffed, as shown, forming soft cushions *d*, which, when the two portions of the case are closed together, entirely surround the bunch of bananas, and effectually hold it in place against any movement within the case, thus preventing any liability of the fruit being jammed or bruised during transportation, while, as no hay or other loose packing material is used, the fruit is received by the retailer in a superior condition, and as bright and clean as it was before being packed for shipment, thus avoiding the loss of time and labor heretofore required in cleaning and picking out the hay and chaff from between the individual bananas before exposing them for sale—advantages which will be readily appreciated by those in the trade. The case A is preferably provided on all sides, as well as the top and bottom, with ventilating air-apertures *e*, extending through the wood, as seen in Fig. 2, through which a plentiful supply of air is admitted to the interior of the case, in order to insure the proper ventilation and preservation of the fruit within it, the stuffing of the cushions *d* being preferably composed of "excelsior," or other cheap sweet material of such nature as to allow the air entering the ventilating-apertures to pass freely through it, while the covering of the cushions is preferably composed of burlaps or other coarse porous fabric that will also allow of the free passage of the air. The cushions *d* thus admit air freely to the interior of the case, and at the same time serve as screens to prevent the passage of dust or cinders, which would be liable to enter the apertures *e* during transportation in railway-cars, or in express-wagons on common roads, and for winter use the cushions are also especially valuable, as they will effectually prevent the freezing of the fruit during transportation.

The above-described packing-case is neatly finished on the outside, and when opened in halves, as seen in Fig. 1, will form for retailers a neat, clean, and convenient stand for containing the fruit, and in which it may be advantageously exposed for sale.

These cases are to be made of different sizes, to contain larger or smaller bunches of bananas; or they may be of such size as to contain several bunches, the two halves being held together, when closed, by hooks $f$, or by a suitable hasp and padlock, if preferred.

The case is intended to be returned to the shipper and used over and over again, instead of being discarded, like a common peach-crate, after once being used, and consequently the loss heretofore entailed upon the shipper is avoided. At the ends of the case are cords $g\,g$, which may be used, if desired, for tying the ends of the bunch of bananas, and thus holding it with additional security should it not properly fit the interior of the receptacle, and in the latter case small cushions or stuffed bags $h$, Fig. 3, may be employed, if desired, to fill or chock up any spaces between the fruit and the padded sides of the case; but these are not usually required.

What I claim as my invention, and desire to secure by Letters Patent, is—

A packing-case for containing bananas during transportation, consisting of the receptacle A, of suitable size and shape for holding one or more bunches of the fruit, and having a series of ventilating-apertures, $e$, in combination with stuffed cushions $d$, secured to its interior over the apertures $e$, and adapted to exclude dirt and dust, and at the same time allow of the free passage of air from the apertures $e$ to the interior of the case, substantially as and for the purpose set forth.

Witness my hand this 3d day of March, A. D. 1883.

WILLIAM H. GOSS.

In presence of—
P. E. TESCHEMACHER,
W. J. CAMBRIDGE.